(12) United States Patent
Young et al.

(10) Patent No.: US 10,208,860 B2
(45) Date of Patent: Feb. 19, 2019

(54) SEALING SYSTEM FOR SLIDE OUT ROOMS

(71) Applicant: JAEGER-UNITEK SEALING SOLUTIONS, INC., LaPorte, IN (US)

(72) Inventors: Raymond Young, Wanatah, IN (US); Marc Maloney, Mishawaka, IN (US); Roger Brown, LaPorte, IN (US); Makoto Sato, Bloomfield, MI (US)

(73) Assignee: JAEGER-UNITEK SEALING SOLUTIONS, INC., LaPorte, IN (US)

( * ) Notice: Subject to any disclaimer, the term of this patent is extended or adjusted under 35 U.S.C. 154(b) by 48 days.

(21) Appl. No.: 14/854,948

(22) Filed: Sep. 15, 2015

(65) Prior Publication Data

US 2016/0003358 A1    Jan. 7, 2016

Related U.S. Application Data

(63) Continuation-in-part of application No. 14/726,042, filed on May 29, 2015, now Pat. No. 9,625,037, which is a continuation-in-part of application No. 13/646,013, filed on Oct. 5, 2012, now Pat. No. 9,045,027.

(51) Int. Cl.
*F16J 15/02* (2006.01)
*B60J 10/00* (2016.01)
*B60P 3/34* (2006.01)

(52) U.S. Cl.
CPC ............. *F16J 15/027* (2013.01); *B60J 10/00* (2013.01); *B60P 3/34* (2013.01)

(58) Field of Classification Search
CPC . F16J 15/027; B60J 10/00; B60P 3/34; B65H 45/02; B65H 55/02
USPC ................................................... 277/644, 590
See application file for complete search history.

(56) References Cited

U.S. PATENT DOCUMENTS

| | | | | |
|---|---|---|---|---|
| 3,722,640 A | * | 3/1973 | Taylor | .................... B60R 19/32 188/316 |
| 4,695,499 A | | 9/1987 | Whitener | |
| 5,616,403 A | | 4/1997 | Eckberg et al. | |
| 6,158,171 A | * | 12/2000 | Kellogg | ................ E06B 7/2303 49/475.1 |
| 6,203,734 B1 | | 3/2001 | Schoonover et al. | |

(Continued)

OTHER PUBLICATIONS 61-624137 spec-draw; Apr. 25, 2012 (Year: 2012).*
TPE data sheet; 2007; p. 355 (Year: 2007).*

*Primary Examiner* — Nathan Cumar
(74) *Attorney, Agent, or Firm* — Vedder Price P.C.

(57) ABSTRACT

A seal useful in sealing slide out rooms used in recreational vehicles. The seal may be used singularly or in pairs to straddle a wall through which the opening is located. A bulb is attached to the base in a cantilevered manner over the base. The bulb has an outer arcuate portion that is integrally joined to opposing sidewall portions. The sidewall portions extend into an inner wall that defines an enclosed space within the bulb portion. The bulb portion may also have a protrusion that can touch the base. A wiper extends from the base substantially co-linearly to the base and opposite the offsetting member. A locating leg extending from the base is movable between a first position and a second position. The first position has the locating leg perpendicular to the base and the second position places the locating leg parallel to the base.

5 Claims, 8 Drawing Sheets

(56) References Cited

U.S. PATENT DOCUMENTS

| | | |
|---|---|---|
| 6,527,278 B1 | 3/2003 | Norris |
| 6,966,590 B1 | 11/2005 | Ksiezopolski et al. |
| 7,540,116 B1 | 6/2009 | Martinson |
| 7,614,676 B2 | 11/2009 | Ksiezopolski et al. |
| 7,614,677 B2 * | 11/2009 | Ksiezopolski ............ B60P 3/34 296/171 |
| 7,651,144 B2 | 1/2010 | Clark et al. |
| D648,657 S | 11/2011 | Schoonover et al. |
| D651,146 S | 12/2011 | Schoonover et al. |
| 8,192,827 B2 | 6/2012 | Schoonover et al. |
| D664,669 S | 7/2012 | Schoonover et al. |
| D664,670 S | 7/2012 | Schoonover et al. |
| D669,601 S | 10/2012 | Schoonover et al. |
| D669,820 S | 10/2012 | Schoonver et al. |
| 8,366,168 B1 | 2/2013 | Ksiezopolski et al. |
| 8,382,124 B2 | 2/2013 | Ksiezopolski et al. |
| 8,408,625 B1 | 4/2013 | Ksiezopolski et al. |
| D697,640 S | 1/2014 | Ksiezopolski |
| 8,701,351 B2 | 4/2014 | Siegel |
| 8,875,443 B2 | 11/2014 | Siegel |
| 8,910,422 B2 | 12/2014 | Siegel |
| 8,985,662 B2 | 3/2015 | Siegel |
| 9,033,390 B1 | 5/2015 | Ksiezopolski |
| 9,038,322 B2 | 5/2015 | Ksiezopolski |
| 9,068,355 B1 | 6/2015 | Ksiezopolski |
| 2006/0091687 A1 * | 5/2006 | Schoffner ................ B60P 3/34 296/26.01 |
| 2008/0116707 A1 * | 5/2008 | Boaz ........................ B60P 3/34 296/26.01 |
| 2008/0282617 A1 * | 11/2008 | Zimmer ............. B60R 13/0206 49/495.1 |
| 2013/0048550 A1 * | 2/2013 | Miles ...................... C02F 9/005 210/251 |
| 2013/0086865 A1 | 4/2013 | Schoonover et al. |
| 2014/0265051 A1 | 9/2014 | McNish et al. |
| 2015/0158438 A1 | 6/2015 | Klsiezopolski |

\* cited by examiner

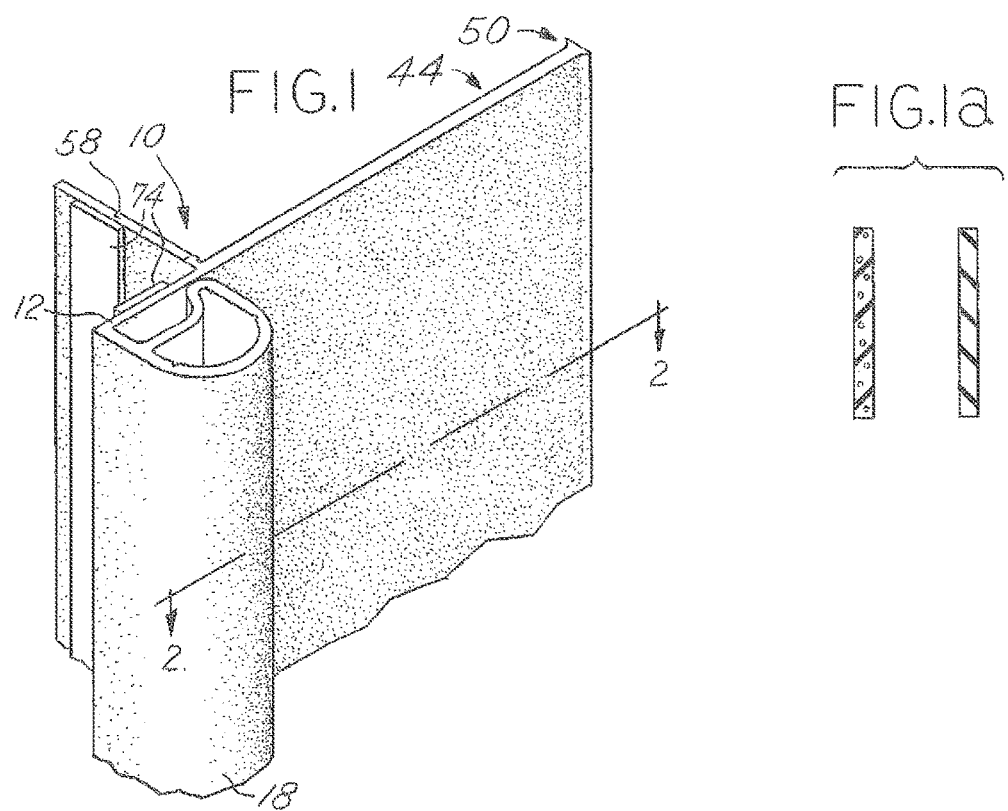
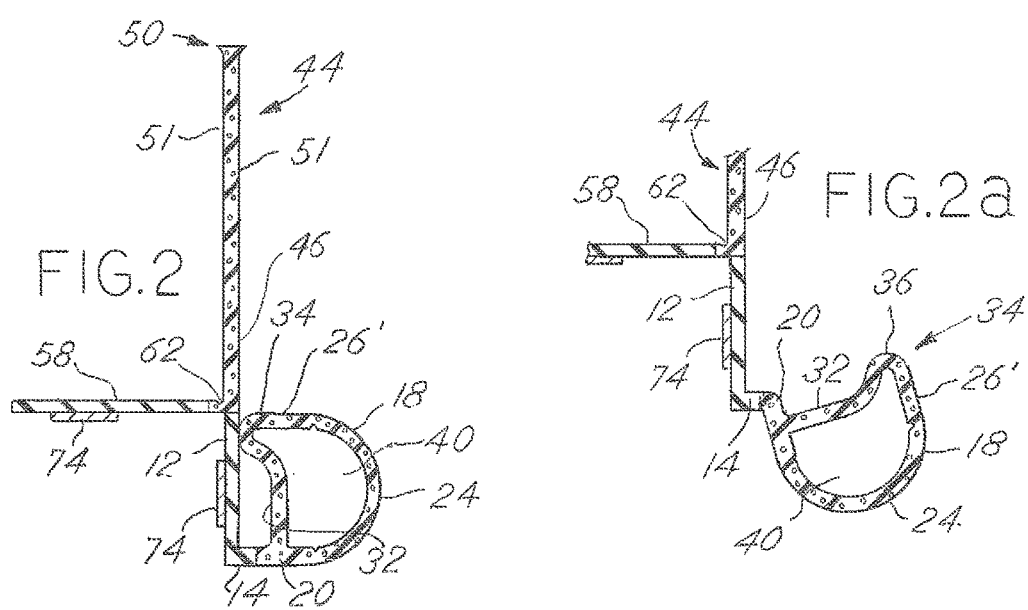

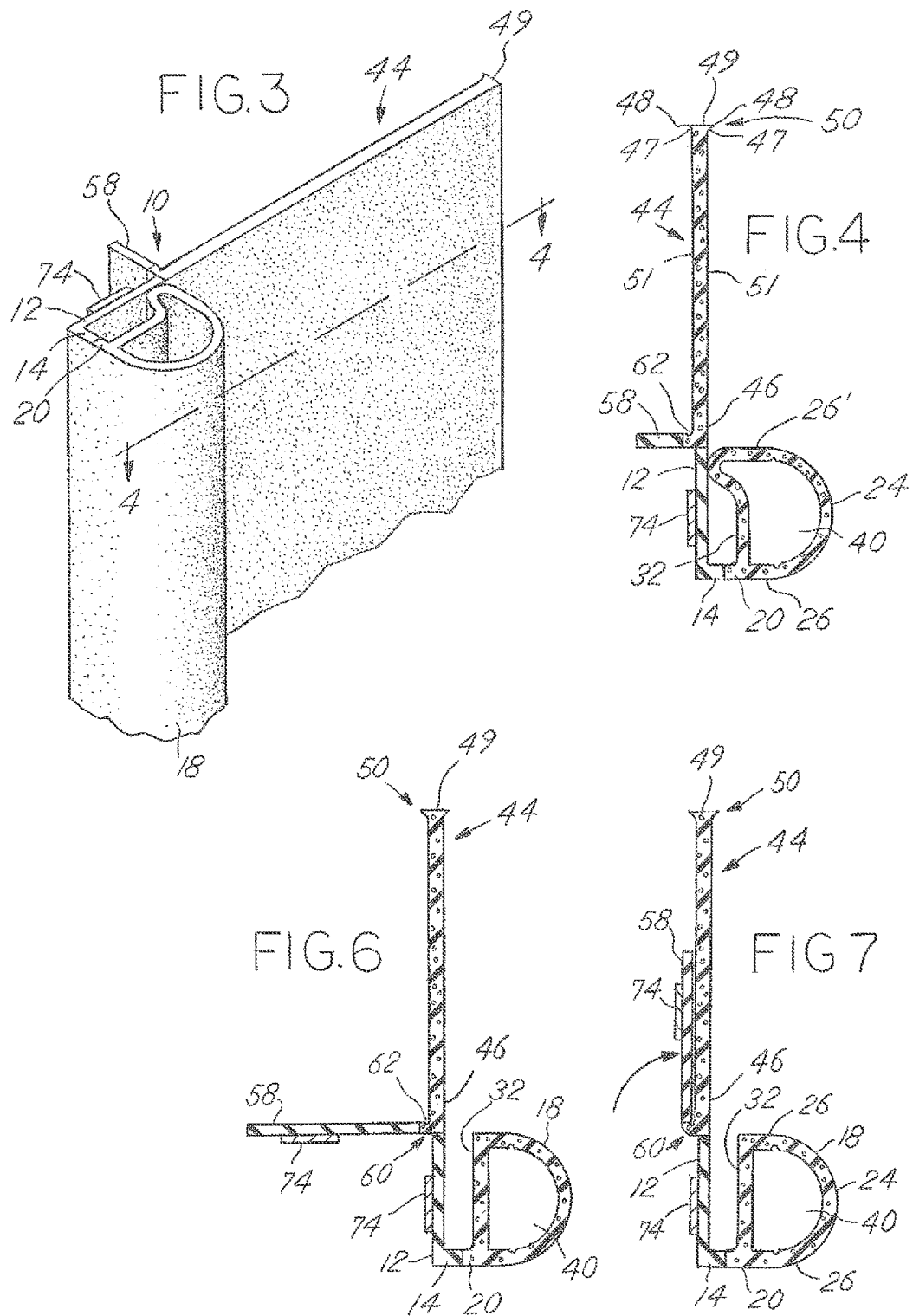

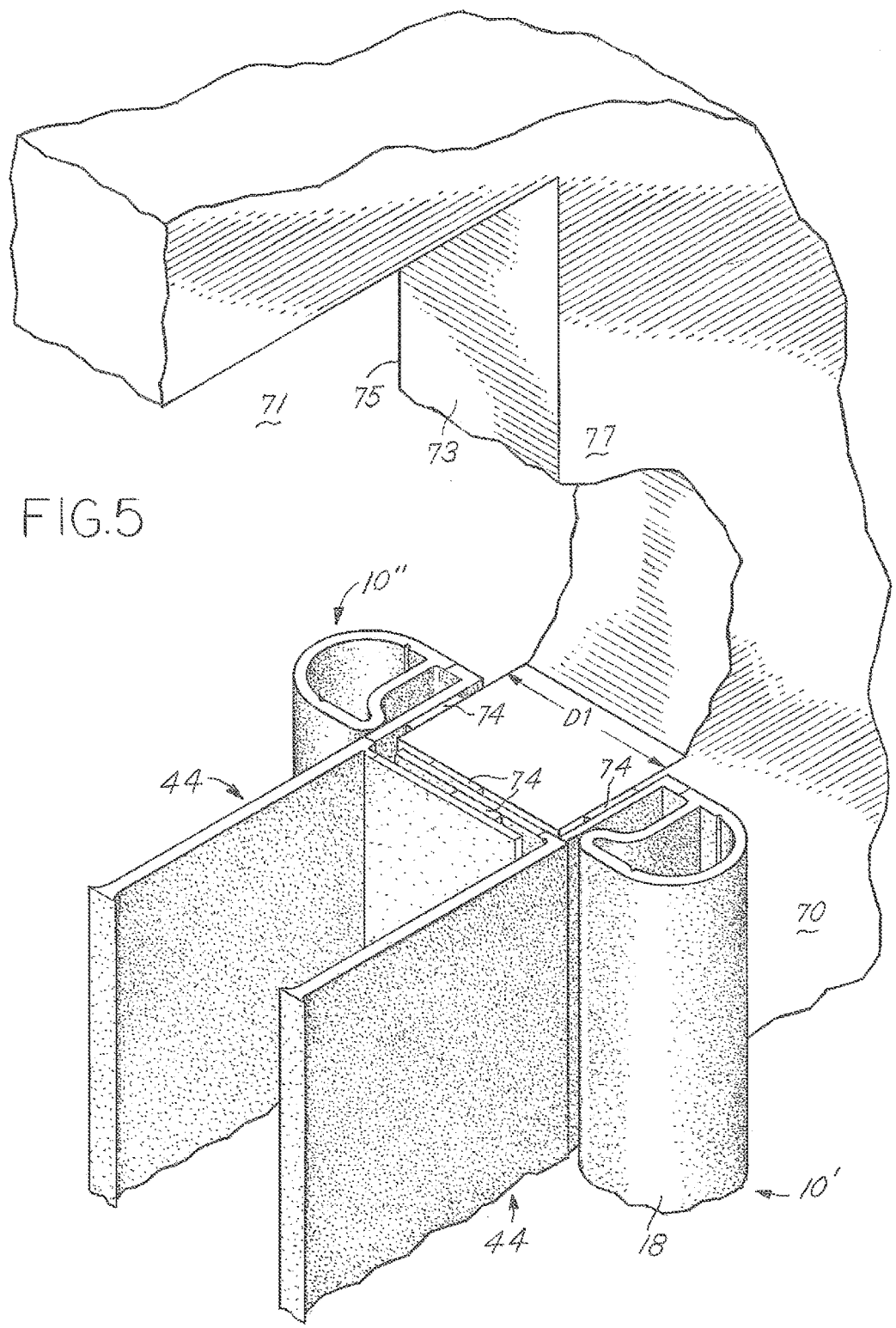

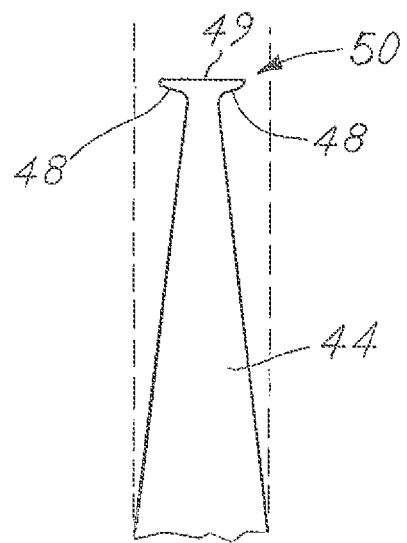
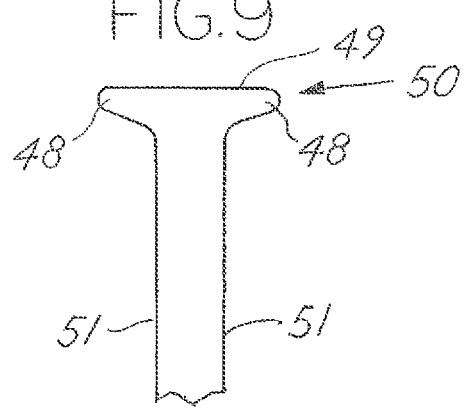

SEALING SYSTEM FOR SLIDE OUT ROOMS

RELATED APPLICATIONS

The present utility patent application is a continuation-in-part application of U.S. patent application Ser. No. 14/726,042 filed on May 29, 2015 that is a continuation-in-part of U.S. patent application Ser. No. 13/646,013 filed on Oct. 5, 2012, now issued as U.S. Pat. No. 9,045,027, the contents of which are incorporated by reference in their entireties.

BACKGROUND OF THE INVENTION

Seals for slide out rooms in recreational vehicles are typically cumbersome in their use and installation. This is due to several factors. First, the openings for slide out rooms are not standard in that the wall thickness is not always uniform. This often forces the use of many seals to cover various wall thicknesses. It is also possible that the walls are not perfectly even in their thickness. Shipping seals for slide out rooms can be difficult as well. Having a C-channel to straddle a recreational vehicle wall near the opening does not usually allow such a seal to be bent so it may be coiled for shipping. This forces such seals to be shipped in cut lengths. Thus, many seals for different widths may need to have cut lengths shipped. As can easily be imagined, this creates an inventory nightmare.

SUMMARY OF THE INVENTION

A seal that is particularly useful in sealing slide out rooms used in recreational vehicles. The seal may be used singularly or in pairs to straddle a wall through which the opening is located. The seal has a base that includes an offsetting member. The offsetting member is connected to a bulb portion. The bulb portion may have its own offsetting member that is joined to the offsetting member of the base. Each respective offsetting member is made of the same material as the part from which it extends. The bulb has an outer arcuate portion that is integrally joined to opposing sidewall portions. The sidewall portions extend into an inner wall that defines an enclosed space within the bulb portion. The bulb portion may also have a protrusion that can touch the base.

A wiper extends from the base substantially, co-linearly, to the base and opposite the offsetting member. The wiper has a proximal end and a distal end, with the proximal end being integrally joined to the base. A locating leg extends perpendicular to the base and has a distal end and a proximal end that is integrally joined to the base. The locating leg is movable between a first position and a second position. The first position has the locating leg perpendicular to the base and the second position places the locating leg parallel to the base.

The present disclosure also relates to an elongate seal that includes a base, a bulb portion being joined to the base and a locating leg extending substantially perpendicular to the base and integrally joined to the base at a proximal end. The locating leg of the seal may also include a hook extending at an acute angle relative to the locating leg. The seal may also include a neck positioned adjacent the hook wherein the neck is a portion of the locating leg with a reduced cross section to permit the hook to flex toward the locating leg.

The present disclosure also describes a method of installing a seal system around a rectangular opening, such as the opening for a slide out room of a recreational vehicle. The method includes installing a first length of an elongate seal along a first surface of the rectangular opening. The seal is installed such that the wiper of the seal extends from the first surface into the rectangular opening. The method may also include the step of installing a second length of the elongate seal along a second surface of the rectangular opening. The wiper of the second length also is positioned such that it extends into the rectangular opening from the second surface. The respective wipers of the first and second lengths of the elongate seal overlap at the corner of the rectangular opening where the first surface and the second surfaces intersect. In addition, the bulb of the second length of the seal is flipped up and over the wiper of the first length of the seal. In this manner, a water resistant sealing system is achieved that does not require significant additional steps during installation once the first and second lengths of the seal are cut at appropriate lengths.

The present disclosure also describes a method of storing, transporting or packaging an elongate seal. The method includes the steps of folding the locating leg of the elongate seal from a first position to a second position. The elongate seal is configured such that the locating leg is movable from the first position to the second position by a leg hinge located oppositely the bulb portion of the seal and adjacent to the base. The method further includes coiling the elongate seal about a neutral axis corresponding to a line between the base and the locating leg when the locating leg is in the second position. In this manner a length of the elongate seal can be coiled into a roll that can be easily stored, transported or packaged.

BRIEF DESCRIPTION OF THE DRAWINGS

FIG. 1 is a perspective view of the seal;

FIG. 1A is a material sample showing low durometer material on the left and high durometer material on the right;

FIG. 2 is a sectional view of the seal as taken along line 2-2 in FIG. 1 indicating high and low durometer areas of the seal;

FIG. 2A is a sectional view of the seal like that shown in FIG. 2 showing the seal in its second position with the bulb bent away from the base;

FIG. 3 is a perspective view of the seal;

FIG. 4 is a sectional view of the seal as taken along line 4-4 in FIG. 3;

FIG. 5 is a view of two seals as shown in FIG. 1 in their installed position in an opening in a recreational vehicle wall;

FIG. 6 is a sectional view of a different embodiment of the seal lacking a protrusion;

FIG. 7 shows the seal in FIG. 6 with the locating leg in its second position.

FIG. 8 shows a tapered wiper with flared tip;

FIG. 9 shows a magnified view of the flared tip;

DETAILED DESCRIPTION OF INVENTION

Figure 10:
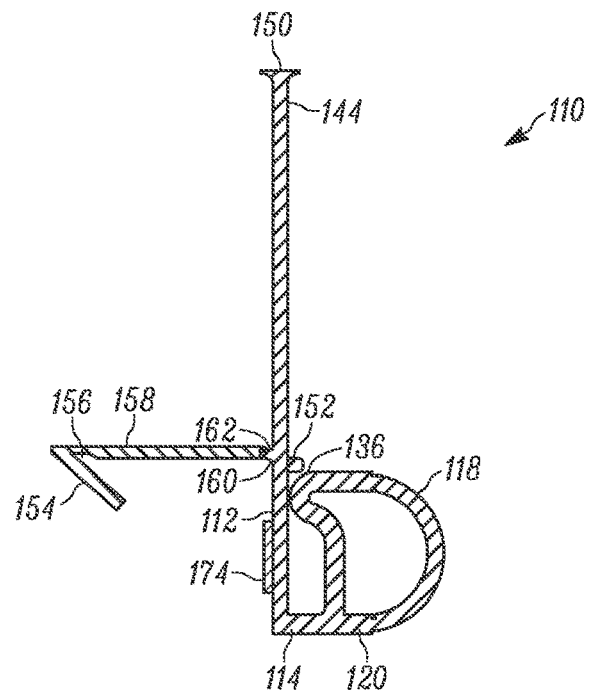
FIG. 10 shows a sectional view of another embodiment of the present disclosure.

FIG. 1 shows the seal 10 of this invention in perspective. This seal is particularly useful in the sealing of slide out rooms used in recreational vehicles, and FIG. 5, shows how the seal 10 is installed for such a purpose. The seal 10 includes a base 12 that has a first offsetting member 14 extending from it to form an L-shape. The base 10 is a relatively high durometer material compared to the rest of the seal, and while resilient to some degree it is substantially less flexible than other parts of the seal 10. The base 12 is made of a material of approximately 90 shore A.

The first offsetting member 14 extends perpendicularly from the base 12 toward a bulb portion 18. The bulb portion 18 has a second offsetting member 20 that extends toward the first offsetting member 14 and is integrally joined with it. The first and second offsetting members' combined length span the distance between the base 12 and bulb portion 18. The bulb portion 18 is made of a material that is a lower durometer than the base 12. The bulb portion 18 and its second offsetting member 20 are made of a material that is approximately 35 shore A. The bulb portion 18 has an outer arcuate portion 24 that is joined to opposing sidewalls 26. The sidewalls 26 extend into an inner wall 32. As shown in FIGS. 6 and 7, the bulb portion 18 has a flat inner wall 32 that is parallel to the base 12. The inner wall 32 may also include a protrusion 34 as shown in FIG. 4. The embodiment of FIG. 4 has sidewall 26' being longer than the other sidewall 26. Because the sidewall 26' is longer than sidewall 26 the protrusion 34 includes an arcuate terminal end 36 that transitions integrally into the inner wall 32. In this way, the inner cavity 40 of the bulb portion 18 continues into the protrusion. The use of the same wall thickness in the protrusion 34, sidewalls 26, 26', and inner wall 32 allows the entire bulb portion 18 to be readily deformable when pressed against the base 12.

A wiper 44 extends co-linearly from the base 12 and is integrally joined at a proximal end 46. A distal end 49 is cantilevered with respect to the proximal end 46. The wiper 44 has lateral sides 51 that are substantially parallel and the distal end 49 includes a flared tip 50. It is also contemplated that the lateral sides may in some cases not be parallel if non-uniform cross sections are desired. For instance, a taper narrowing toward the distal may be used, as shown in FIG. 8. As seen in FIG. 4, the flared tip 50 is wider than the rest of the wiper 44 and has two arcs 47 that transition into opposing corners 48 that define the maximum width of the flared tip 50. FIG. 9 shows the corners 48 in detail. The corners can be radiused as shown in FIG. 9 or can be sharp corners. The end of the flared tip 50 of FIG. 4 is perpendicular to the lateral sides 51. It may be possible that the flared tip 50 is not the widest part of the wiper 44 and this is shown in FIG. 8. In this case, the wiper 44 tapers toward the distal end 49 until widening at the flared tip 50. In the embodiments shown in FIGS. 4, 5, 8 and 9, the flared tip 50 is wider than the portion of the wiper 44 adjacent to the tip. The wiper 44 is made of a lower durometer material than that of the base 12. The wiper 44 material is approximately 35 shore A hardness. As such, even though the wiper 44 and base 12 have roughly the same thickness, the wiper 44 is substantially more flexible than the base 12. The different durometer materials used in the seal 10 are shown in FIG. 1A. The hatching shown on the left side in FIG. 1A corresponds to the areas of lower durometer material, and the higher durometer material of the base 12 is shown on the right hand side of FIG. 1A. The locations of the different materials are shown in FIGS. 2 and 2A. The seal 10 is coextruded so the transitions between materials are integrally joined. The locations of the lower and higher durometer materials are placed to provide predictable bending of the seal 10. The offsetting members 14, 20 provide a combined distance allowing for the bulb portion 18 to have a first position, shown in FIG. 2, where the inner wall 32 is spaced parallel to the base 12 a distance equal to the combined distance. The protrusion 34 in this first position touches the base 12 at its terminal end 36 in this first position. In some cases it may be desirable that the combined distance of the offsetting members 14, 20 be greater than the protrusion 34 so the terminal end 36 does not touch the base 12 in the first position. The seal 10 of FIGS. 2 and 2A in its first position completely encloses and covers the base 12. The resiliency of the offsetting members 14, 20 bias the cantilevered bulb portion 18 into the first position shown in FIG. 2. The offsetting members 14, 20 provide predictable bending that allows the bulb portion 18 to be bent into a second position shown in FIG. 2A. The second offsetting member 20 being of a softer durometer yields to provide a bendable hinge while the first offsetting member 14 does not move. The single connection to the bulb portion 18 to the base through the offsetting members 14, 20 provides a sufficient gap between the inner wall 32 and base 12 to accommodate fasteners that may be driven through the base 12.

A locating leg 58 extends perpendicularly with respect to the base 12 and is joined with a hinge 60 where the proximal end 46 of the wiper 44 joins the base. The entire locating leg 58 is farther from the offsetting members 14, 20 than the outermost portion of the sidewall 26, 26' nearest the wiper 44. Therefore, the entire bulb portion 18 is between the outermost portion of the offsetting members 14, 20 and the surface of the locating leg 58 facing the offsetting members 14, 20. The locating leg 58 is made from the same durometer material as the base as can be seen by the sectioning in FIGS. 2, 2A, 4, 6 and 7. As shown in FIG. 6 the locating leg 58 is in its first position, perpendicular to the base 12. The locating leg 58 has a single hinge 60 that consists of a single thinned section 62 that is on the same side of the leg 58 as the wiper 44. The thinned section 62 being in that location places the score that defines the thinned section 62 on the folding side of the leg 58 when the leg is folded into its second position shown in FIG. 7. The second position in FIG. 7, in which the leg 58 is folded adjacent to the wiper 44, is particularly important for transportation of the seal 10 before it is installed. As can be seen in FIG. 7, the highest durometer portions of the seal, being the base 12 and locating leg 58, are nearly aligned. This provides a very low moment of inertia with respect to the high durometer portions of the seal 10 so that it may be easily bent about a neutral axis that would correspond to a line between the base 12 and locating leg 58 in its second position. Because of the shape of the seal 10 in its second position, it can easily be coiled so that desired lengths may be cut from a much larger roll of the seal 10.

Installation of the seal 10 in its intended use is shown in FIG. 5. Wall 70 is a typical recreational vehicle sidewall that receives a slide out room that is not shown. The wall 70 has a thickness D1 that can vary between different manufacturers or different models of recreational vehicles. The wipers 44 extend inwardly into the opening 71 and rub against a sidewall of the slide out room to form a seal. The opening 71 includes a transverse surface that extends between an inner surface 75 and an outer surface 77. Because of the high friction that may be encountered on the wipers 44, an anti-friction coating may be applied to the surface near the flared tips 50. The coating is between 0.002 and 0.010 inches and has a durometer of 40-90 shore D. The coating is a thermoplastic vulcanizate (TPV) that has flexibility in spite of its hardness. This will allow the corners 48 of the tip 50 to conform to the sidewall of the slide out room and be resistant to abrasion. In addition to providing a low friction surface, the coating provides a surface that will not adhere to the surfaces it contacts. This is an important property for the arcuate portions 24 of the bulb portions 18 because the flanges of the slide out room will be compressed against the arcuate portions 24 then the slide out room is extended or retracted. During times of extreme heat this could cause lower durometer materials to stick to a flange on the slide out and the coating prevents adhesion of the bulb portions 18 to the flanges.

Installation of the seal is done by using adhesive tape 74 to secure the seal 10 in place. A first seal 10' is installed into the opening 71 with its leg 58 in the first position. The double sided adhesive tape strips 74 hold the seal in place as shown in FIG. 5. Additionally, screws may be driven through the base 12 into wall 70 for additional security in retaining the seal 10' in its desired location. This is done by bending the bulb portion 18 to its second position and then letting the bulb portion 18 snap back into its first position. This will conceal screws driven into the base 12. A second seal 10'' is placed oppositely of the first seal 10' so that its leg 58 overlaps the leg 58 of the first seal 10' and its base is pressed against the wall 70. As FIG. 5 shows the seals 10' and 10'' form a system of sealing that provides two wipers 44, which then form a watertight connection to the wall 70 on both sides as well as a watertight connection between the overlapping legs 58. The overlapping legs 58 of the system allow the seals 10' and 10'' to conform to many different wall thicknesses D1. Each seal 10' and 10'' has the same cross section, thus, it is possible to have a single roll of the seal 10, cut it to the desired length, and use a piece of the same roll for both sides of the wall 70. The likelihood of a watertight seal for the slide out room is better with the present system due to the simplicity of installation and the elimination of confusion that arises from using different fixed width seals for different wall thicknesses.

Also, the coating near distal ends 49 of the wipers 44 reduce friction against the slide out room being sealed. As such, using the seals 10 of the present invention allows for using smaller motors to extend and retract the room. The coating on the bulb portions 18 of the seals 10 prevents the flanges from sticking and causing actuating motors to strain, to break the flange from prior art seals. Thus, wear is saved on both electrical components and mechanical components because sudden current surges will not be drawn by overworked motors.

FIG. 10 depicts another embodiment of the seal previously described. FIG. 10 shows seal 110. This seal is also particularly useful in the sealing of a slide out room used in recreational vehicles. Many of the features of seal 110 are similar to those previously described and may include base 112, first offsetting member 114, second offsetting member 120, bulb portion, 118, wiper 144, locating leg 158, hinge 160 and flared tip 150. Seal 110, in this embodiment, may also include ridge 152, hook 154 and neck 156.

Ridge 152 is a raised section of seal 110 and is configured to run the length of seal 110 and is located adjacent to terminal end 136 on base 112. Ridge 152 advantageously restricts the deflection of bulb portion 118 at terminal end 136 toward wiper 148. This restriction creates a more robust seal between mating components that are to be sealed, such as a slide out room of a recreational vehicle. In this embodiment, ridge 152 is a raised protrusion of material with a rounded end. Other shapes and sizes of ridge 152 may also be used.

Seal 110, as depicted in the embodiment of FIG. 10, also includes hook 154 and neck 156. Hook 154 is an element of locating leg 158. Hook 154 is connected to locating leg 158 at the end of locating leg 158 opposite wiper 144 and base 112. Hook 154, in one example, is approximately one-third the length of locating leg 158 and is configured such that it resides at an acute angle with respect to locating leg 158. In this example, hook 154 is linear but other shapes, lengths and orientations of hook 154 can also be used, such as, but not limited to, arcs, curves, or the like. This embodiment of seal 110 also includes neck 156. Neck 156 is a portion of locating leg 158 near the point at which hook 154 connects to locating leg 158. Neck 156 is the portion of locating leg 158 that permits hook 154 to flex relative to locating leg 158. In this example, neck 156 is an area of locating leg with a reduced cross section of material. This reduction in material creates a hinge point at which hook 154 can flex such that, when compressed, hook 154 can lay substantially parallel to locating leg 158. Other configurations of neck 156 can also be used such as notches, differing materials or the like so long as hook 154 is permitted to flex relative to locating leg 158.

Figure 11:
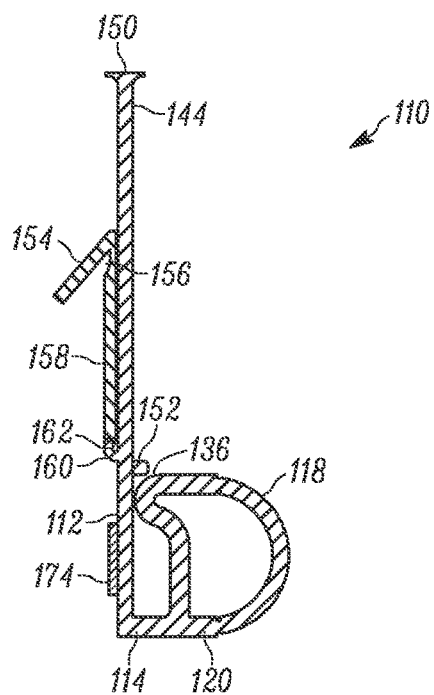
FIG. 11 shows a sectional view of the seal of FIG. 10 with a locating leg in a second position.

The embodiment of seal 110 as shown in FIGS. 110 and 110 can be constructed in similar materials as previously described and be coextruded such that the aforementioned features can be integrally joined. Locating leg 158 of seal 110 can also be moved to a second position as shown in FIG. 11. In this second position, locating leg 158 is located adjacent to wiper 144. In this position, long lengths of seal 110 can be coiled. Large coiled lengths of seal 110 can be stored and/or transported with greater ease.

As previously described, two seals 110 can be used with each other to provide a sealing system for a slide out room for a recreational vehicle. Two seals 110 are used on opposite sides of a wall as shown in FIG. 5. However, in this embodiment, instead of adhesive tape 74 on locating leg 158, hook 154 and neck 156, when compressed in position, provide a water resistant seal system to prevent the intrusion of water.

The seal of the present disclosure also provides an advantageous system around a square or rectangular shaped opening, such as the opening in which a slide out room moves on a recreational vehicle. With conventional seals that do not include the elements previously described, a seal would require modification, cutting or other special processing when the seal is installed at the corners of a rectangular opening. With seal 10, 110, special processing is not required to result in a water resistant sealing system at the corners of a rectangular opening.

Figure 12:
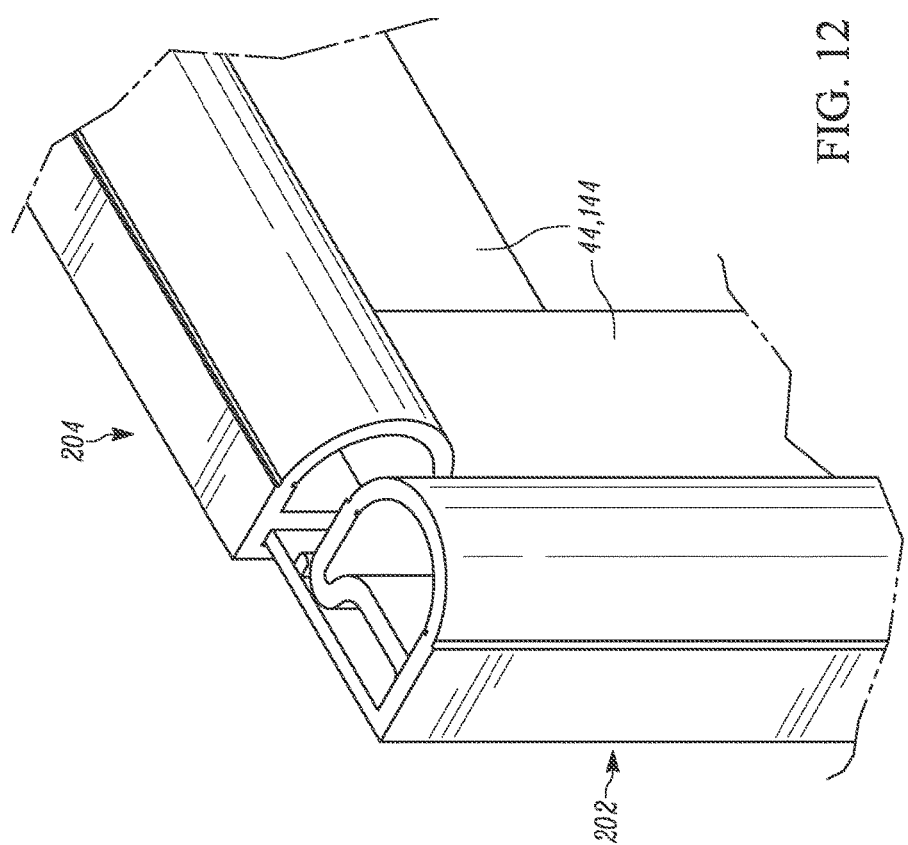
FIG. 12 shows one embodiment of the seal installed at a corner.

FIG. 12 shows seal 10, 110 installed at a corner of a rectangular opening. At the corner, a vertical length 202 of seal 10, 110 and a horizontal length 204 of seal 10, 110 are installed on the respective vertical and horizontal surfaces of the rectangular opening. The configuration of seal 10, 110 permits wiper 44, 144 to overlap at the corners and the top end 206 of vertical length 202 is substantially flush with offsetting member 14, 114 on horizontal length 204. As can be appreciated, bulb portion 18, 118 is flipped up and over wiper 44,144 of vertical length 202 in this configuration. This arrangement of vertical length 202 and horizontal length 204 creates a robust water resistant sealing system at the corner of the rectangular opening. Such an arrangement only requires an installer to cut the seal to the appropriate length for the rectangular opening and install the lengths of seal 10, 110 on the vertical and horizontal surfaces. The bulb portion 18, 118 can then be flipped up and over the overlapping portion of wiper 44, 144 at the corners to finish the assembly. As previously described the bulb portion 18, 118 of vertical length 202 is flipped up and over the wiper 44, 144 of the horizontal length 204. As can be appreciated, the seal can also be installed such that the bulb portion 18, 118 of horizontal length 204 can be flipped up and over the wiper 44, 144 of vertical length 202. In this configuration, the respective lengths need to be cut at the appropriate sizes to achieve the ninety degree flush corner.

Figure 13:
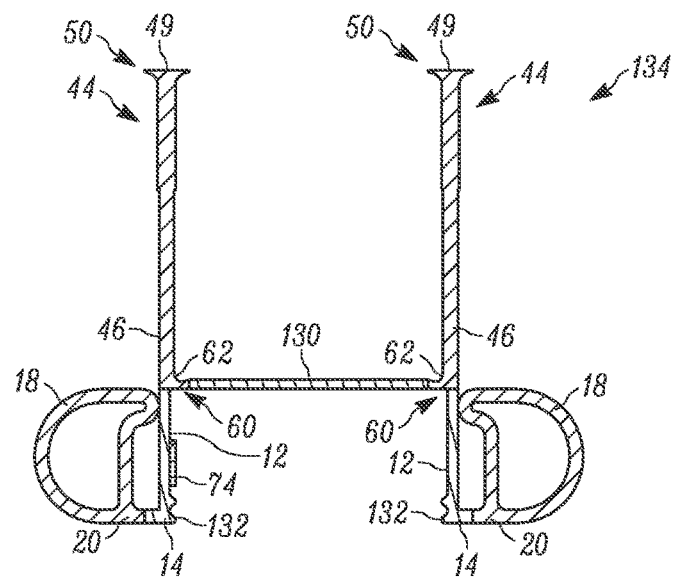
FIG. 13 is a sectional view of another embodiment of a seal of the present disclosure.
Figure 15:
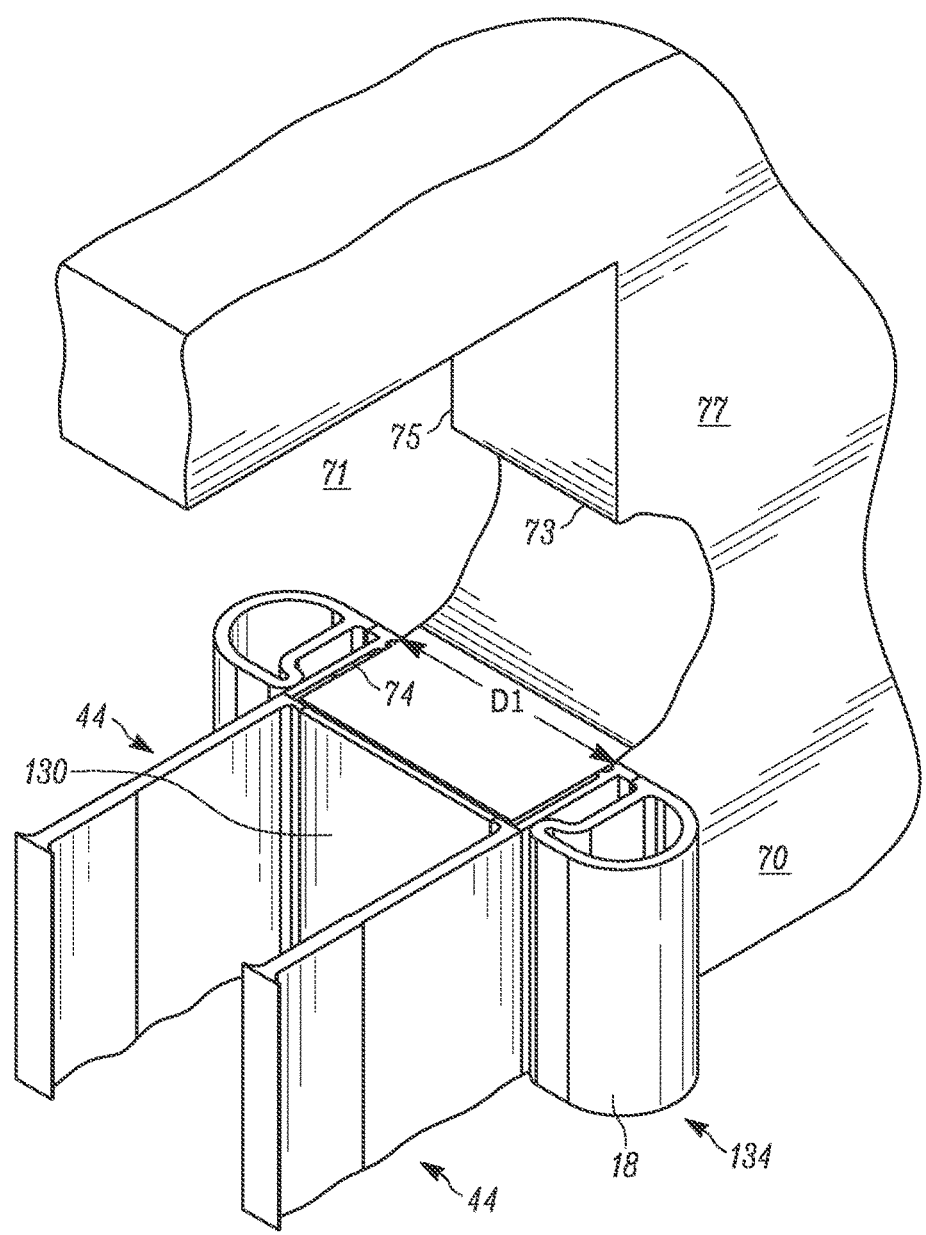

FIG. 13 shows another embodiment of a seal of the present disclosure. Bridge seal 134 includes bridge member 130 that joins two bulbs 18 to provide a one-piece seal that is particularly useful in the sealing of slide out rooms used in recreational vehicles, and FIG. 15, shows how bridge seal 134 is installed for such a purpose. Bridge seal 134 includes substantially the same construction on either side of bridge member 130. The construction of bridge seal 134 can generally be of the same construction as that described earlier regarding the structure of seal 10 except such construction is reproduced in a symmetrical relationship on either side of a midpoint of bridge member 130. On one side of bridge member 130, bridge seal 134 may include base 12 that has a first offsetting member 14 extending from it to form an L-shape. The base 12 is a relatively high durometer material compared to the rest of the seal, and while resilient to some degree it is substantially less flexible than other parts of bridge seal 134. In one embodiment, base 12 is made of a material of approximately 90 shore A.

As further shown in FIG. 13, first offsetting member 14 extends perpendicularly from the base 12 toward a bulb portion 18. The bulb portion 18 has a second offsetting member 20 that extends toward the first offsetting member 14 and is integrally joined with it. The first and second offsetting members' combined length span the distance between the base 12 and bulb portion 18. The bulb portion 18 is made of a material that is a lower durometer than the base 12. In one embodiment, bulb portion 18 and its second offsetting member 20 are made of a material that is approximately 35 shore A. The bulb portion may have a shape similar to that described above regarding seal 10.

Bridge seal 134 may also include wipers 44 extending co-linearly from the base 12 and integrally joined at a proximal end 46. A distal end 49 is cantilevered with respect to the proximal end 46. Wipers 44 may also include a flared tip 50. It is also contemplated that the lateral sides of wipers 44 may in some cases not be parallel if non-uniform cross sections are desired. Bridge seal 134 may include variations in the shape of wipers 44 as previously described and shown in FIGS. 8 and 9. As seen in FIG. 13, flared tips 50 are wider than the rest of wipers 44 and have arcs that transition into opposing corners that define the maximum width of the flared tip 50. FIG. 9 shows one embodiment of the corners of flared tips 50 in detail. Wipers 44 can be made of a lower durometer material than that of the base 12. In one embodiment wiper 44 material is approximately 35 shore A hardness. As such, even though the wiper 44 and base 12 have roughly the same thickness, the wiper 44 is substantially more flexible than the base 12. The different durometer materials as previously described can also be used in the similar portions of bridge seal 134.

Bridge seal 134 can be coextruded so the transitions between materials are integrally joined. The locations of the lower and higher durometer materials are placed to provide predictable bending of the bridge seal 134. The offsetting members 14, 20 provide a combined distance allowing for the bulb portion 18 to have a first position where the inner wall of bulb 18 is spaced parallel to the base 12. The resiliency of the offsetting members 14, 20 bias the cantilevered bulb portion 18 into the first position. The offsetting members 14, 20 provide predictable bending that allows the bulb portion 18 to be bent into a second position exposing an outer surface of base 12. The second offsetting member 20 being of a softer durometer yields to provide a bendable hinge while the first offsetting member 14 does not move. The single connection to the bulb portion 18 to the base through the offsetting members 14, 20 provides a sufficient gap between the inner wall 32 and base 12 to accommodate fasteners that may be driven through the base 12.

Figure 14:
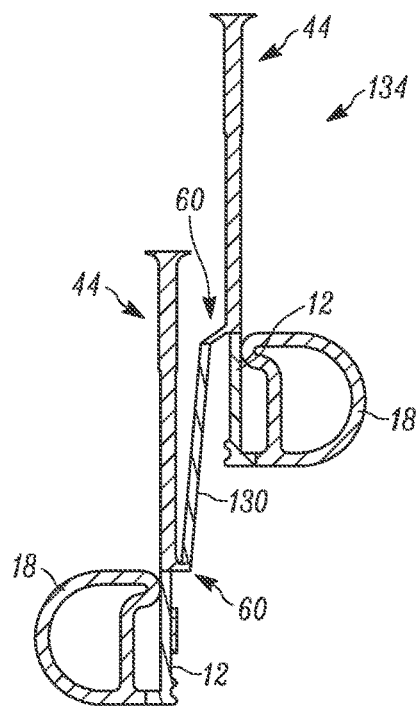
FIG. 14 is a sectional view of the seal of FIG. 13 collapsed into an example shipping position and FIG. 15 is a view of an embodiment of a seal of the present disclosure installed in position on a recreational vehicle wall.

As can also be seen in FIG. 13, bridge seal 134 may include one or more ribs 132. Rib 132 is a raised member that runs along the length of bridge seal 134 on the inner surface of base 12 opposite bulb portion 18. Rib 132 is raised and provides additional sealing surface area in the event that adhesive tape or other connection materials are used on the inner surface of base 12. In one embodiment, two rows of ribs 132 are provided on both first and second bases 12. Other quantities and shapes of ribs 132 can also be used. Rib 132 can have a curved circular profile as shown or can be configured as a fin, with a triangular cross-section or other suitable shape.

Where locating leg 58 extended perpendicularly with respect to the base 12 in the embodiments of seal 10 previously described, bridge seal 134 includes bridge member 130 connecting two symmetrical bulb, base and wiper portions. In one embodiment, bridge member 130 is made from the same durometer material as the base. As shown in FIG. 13 bridge member 130 is in its first position, perpendicular to the bases 12. Bridge member 130 has a hinge on each end near its points of connection to wipers 44 and bases 12. The points of connection of bridge member 130 include a hinge 60 that consists of a thinned section 62 that is on the same side of the bridge member 130 as the wiper 44. A second position of bridge member 130 is shown in FIG. 14. In the second position, bridge member 130 rotates about hinges 60 and bridge member moves to position closer to being parallel to wipers 44. Bridge member 130 rotates through a position in which it is oblique to each of the bases and permits each base to move in a lateral direction such that that are closer together. In this way, the wipers, bulb and base of each symmetrical sealing portion move closer to each other as shown. As can be appreciated, this position enables bridge seal 134 to be rolled, packaged or shipped more efficiently. The highest durometer portions of bridge seal 134, being the base 12 and bridge member 130, are nearly aligned. This provides a very low moment of inertia with respect to the high durometer portions of the bridge seal 134 so that it may be easily bent about a neutral axis. Because of the shape of the bridge seal 134 in its second position, it can be more easily coiled so that desired lengths may be cut from a much larger roll of bridge seal 134.

Installation of the bridge seal 134 in its intended use is shown in FIG. 15. Wall 70 is a typical recreational vehicle sidewall that receives a slide out room that is not shown. The wall 70 has a thickness D1 that can vary between different manufacturers or different models of recreational vehicles. The wipers 44 extend inwardly into the opening 71 and rub against a sidewall of the slide out room to form a seal. The opening 71 includes a transverse surface that extends between an inner surface 75 and an outer surface 77. Because of the high friction that may be encountered on the wipers 44, an anti-friction coating may be applied to the surface near the flared tips 50. The coating is between 0.002 and 0.010 inches and has a durometer of 40-90 shore D. The coating is a thermoplastic vulcanizate (TPV) that has flexibility in spite of its hardness. Other suitable anti-friction coatings can also be used. This will allow the corners 48 of the tip 50 to conform to the sidewall of the slide out room and be resistant to abrasion. In addition to providing a low friction surface, the coating provides a surface that will not adhere to the surfaces it contacts. This is an important property for the arcuate portions of the bulb portions 18 because the flanges of the slide out room will be compressed against the arcuate portions of bulb portions 18 when the slide out room is extended or refracted. During times of extreme heat this could cause lower durometer materials to stick to a flange on the slide out and the coating prevents adhesion of the bulb portions 18 to the flanges.

Installation of the bridge seal 134 is accomplished using similar methods as previously described. One method is using adhesive tape 74 to secure bridge seal 134 in place. In this embodiment, since bridge seal 134 is only one piece, only one piece of bridge seal 134 is installed into the opening 71 with bridge member 130 spanning the distance or width of wall 70. The double sided adhesive tape strips 74 can be placed on various surfaces of bridge seal 134 such as on bases 12 or bridge member 130 to hold bridge seal in place as shown in FIG. 15. Additionally, screws may be driven through the base 12 into wall 70 for additional security in retaining the bridge seal 134 in its desired location. This is done by bending the bulb portion 18 to its second position and then letting the bulb portion 18 snap back into its first position. This will conceal screws driven into the base 12. As FIG. 15 shows, bridge seal 134 forms a system of sealing that provides two wipers 44, which then form a watertight connection to the wall 70 on both sides as well as a watertight connection between bridge member 130. Bridge member 130 can have different lengths to accommodate different wall thicknesses D1.

The present invention is not limited to the details given above, but may be modified within the scope of the following claims.

What is claimed is:

1. An elongate seal comprising:
    a first base;
    a second base; and
    a bridge member comprising a substantially rigid body extending between a first integrally formed hinge connected to said first base and a second integrally formed hinge connected to said second base, said body of said bridge member being movable between a first position wherein said body is substantially perpendicular to said first base and said second base and a second position wherein said body is oblique to said first base and said second base whereby a lateral distance between said first base and said second base is reduced.

2. The elongate seal as claimed in claim 1 further comprising a first bulb portion connected to the first base and a second bulb portion connected to the second base.

3. The elongate seal as claimed in claim 2 further comprising a first wiper extending co-linearly from one end of said first base and a second wiper extending co-linearly from said second base.

4. The elongate seal as claimed in claim 3 further comprising a first bulb hinge located at the connection of said first bulb portion to said first base and a second bulb hinge located at the connection of said second bulb portion to said second base.

5. An elongate seal comprising:
    a first base;
    a second base being substantially parallel to said first base; and
    a bridge member comprising:
        a first hinge adjacent with and connected to said first base;
        a second hinge adjacent with and connected to said second base;
        a body portion extending between and integrally formed with said first hinge and said second hinge, wherein said body portion is substantially inflexible;
    wherein, by bending said bridge portion at only said first hinge and second hinge, said body portion is movable between a first position in which said body portion is perpendicular to said first base and said second base and said first base and said second base are separated by a first lateral distance and a second position in which said body portion is parallel to said first base and said second base and said first base and said second base are separated by a second lateral distance, wherein said first lateral distance is greater than said second lateral distance.

* * * * *